(12) United States Patent
Cooper (10) Patent No.: US 7,286,177 B2
(45) Date of Patent: Oct. 23, 2007

(54) DIGITAL CAMERA

(75) Inventor: Peter Cooper, Grays Point (AU)

(73) Assignee: Nokia Corporation, Espoo (FI)

( * ) Notice: Subject to any disclaimer, the term of this patent is extended or adjusted under 35 U.S.C. 154(b) by 312 days.

(21) Appl. No.: 10/020,870

(22) Filed: Dec. 19, 2001
(Under 37 CFR 1.47)

(65) Prior Publication Data
US 2003/0112361 A1    Jun. 19, 2003

(51) Int. Cl.
*H04N 5/222*    (2006.01)
(52) U.S. Cl. .............................. 348/333.02; 348/333.04
(58) Field of Classification Search ........... 348/333.04, 348/376, 333.02
See application file for complete search history.

(56) References Cited

U.S. PATENT DOCUMENTS

| 5,006,878 | A | * | 4/1991 | Cloutier ..................... 396/311 |
| 5,430,482 | A | | 7/1995 | Kim |
| 5,666,569 | A | | 9/1997 | Fullam et al. |
| 6,539,177 | B2 | * | 3/2003 | Parulski ..................... 396/287 |
| 6,829,009 | B2 | * | 12/2004 | Sugimoto .............. 348/333.02 |
| 2001/0000969 | A1 | * | 5/2001 | Ohta et al. .................. 348/231 |
| 2003/0067551 | A1 | * | 4/2003 | Venturino et al. .......... 348/364 |

FOREIGN PATENT DOCUMENTS

| EP | 1250002 A1 | 10/2000 |
| JP | 04280584 | 10/1992 |
| WO | 0131892 A1 | 5/2001 |

* cited by examiner

*Primary Examiner*—Vivek Srivastava
*Assistant Examiner*—Justin Misleh
(74) *Attorney, Agent, or Firm*—Banner & Witcoff, Ltd.

(57) ABSTRACT

A digital camera is incorporated into a mobile telephone handset. An image window, used as a viewfinder, includes an indicator in the form of a three-part bar for showing whether an optimal image can be captured. Exposure, white balance and dark reference are determined using algorithms executed by the handset.

27 Claims, 8 Drawing Sheets

DIGITAL CAMERA

FIELD OF THE INVENTION

The present invention relates to a digital camera, particularly but not exclusively to a digital camera included in a mobile communications device.

BACKGROUND ART

Digital cameras are well known in the art. Increasingly, digital-cameras are being incorporated into other devices, such as mobile telephone handsets and an example is described in WO-A-131892.

SUMMARY OF THE INVENTION

The present invention seeks to provide an improved digital camera. According to the present invention there is provided a digital camera including an image quality indicator.

This has the advantage that the user is provided with feedback to indicate whether the camera is ready to take a picture and, if not, to allow the user to take appropriate measures.

The digital camera may include a display for displaying an image together with image quality indicator. The image quality indicator may indicate whether an image is optimal based on one or more image parameters, including light exposure, white balance and/or dark reference.

The digital camera may be incorporated into a mobile communications device, such as a mobile telephone handset.

According to the present invention there is also provided a method of operating a digital camera comprising providing a user interface of the camera with an image quality indicator. The method may comprise capturing an image and displaying the captured image, together with the indicator.

This has the advantage that the user is provided with an objective indication of image quality.

The method may further comprise executing one or more algorithms for determining the quality of the image, such as determining light exposure for the image, performing white balance of the image and/or determining a dark reference for the image. The method may comprise determining whether the one or more algorithms have found a stable solution.

According to the present invention there is still further provided a computer program for performing the method.

According to the present invention there is also provided a digital camera comprising an image sensor, a conversion circuit for receiving signals from the image sensor and producing an image signal, a display for receiving the image signal and outputting an image corresponding to the image signal and a control circuit for controlling the image sensor, the conversion circuit and the display, wherein the control circuit includes a processor configured to determine quality of the image signal and to produce a signal for indicating to a user whether the image signal satisfies one or more image quality conditions.

BRIEF DESCRIPTION OF THE DRAWINGS

An embodiment of the present invention will now be described, by way of example, with reference to the accompanying drawings in which.

DESCRIPTION OF THE PREFERRED EMBODIMENT OF THE INVENTION

Figure 1A:
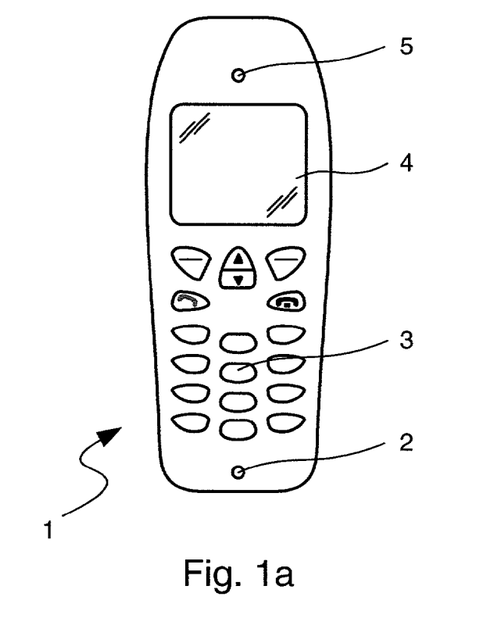
FIG. 1a shows the front of a mobile communications device.

FIG. 1a shows the front of a mobile communications device in the form of a mobile telephone handset 1, which is sometimes referred to as a cellular telephone handset. The handset 1 includes a microphone 2, keypad 3, liquid crystal display (LCD) 4 and speaker 5. The LCD 4 and speaker 5 form part of a user interface.

Figure 1B:
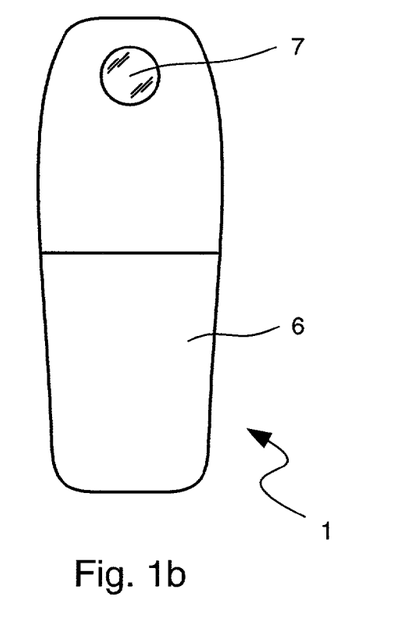
FIG. 1b shows the reverse a mobile communications device.

FIG. 1b shows the reverse side of the handset 1. The handset 1 includes a detachable battery 6 for powering the handset 1 and a digital camera unit 7. The digital camera unit 7 is suitable for capturing still and moving images and comprises a lens, an image sensor, such as a complementary metal oxide semiconductor (CMOS) sensor and an analogue-to-digital (ADC) converter for supplying digital image data.

Figure 2:
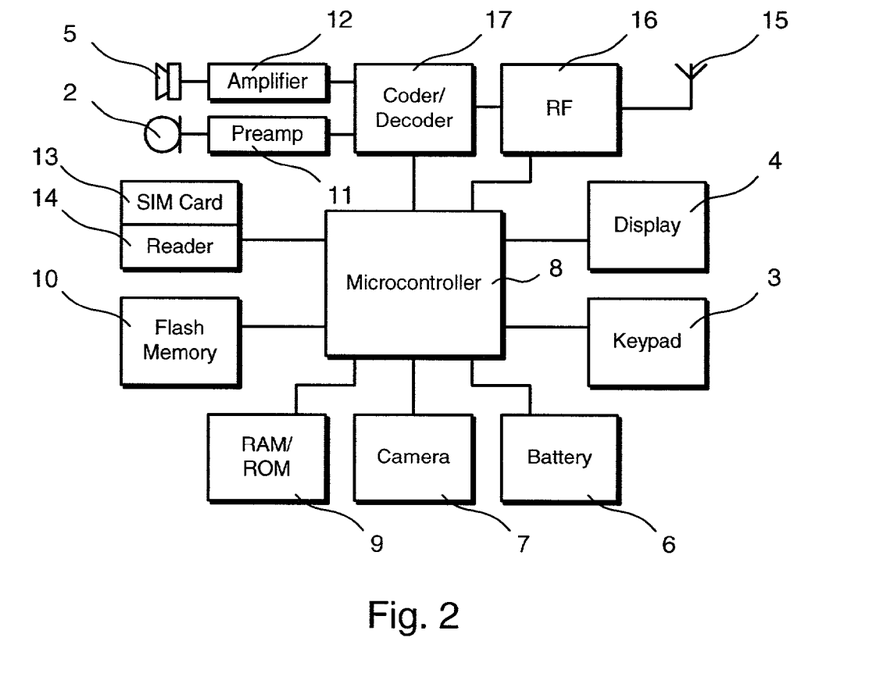
FIG. 2 is a schematic diagram of mobile communications circuitry.

FIG. 2 illustrates circuitry included in the handset 1. Signal processing is carried out under the control of a digital microcontroller 8 which has an associated RAM/ROM 9 and flash memory 10. Electrical analog audio signals are produced by the microphone 2 and amplified by a pre-amplifier 11. Similarly, analog audio signals are fed to the speaker 5 through an amplifier 12. The microcontroller 8 receives instruction signals from the keypad 3 and controls operation of the LCD 4 and flash memory 10.

Information concerning the identity of the user is held on a smart card 13 in the form of a GSM SIM card which contains the usual GSM international mobile subscriber identity and encryption $K_i$ that is used for encoding the radio transmission in a manner well known per se. The SIM card 13 is removably received in a SIM card reader 14. Radio signals are transmitted and received by means of the antenna 15 connected through a RF stage 16 to a codec 17 configured to process signals under the control of a microcontroller 8.

Image data captured by the digital camera unit 7 is processed by the microcontroller 8 and held in flash memory 10. The flash memory 10 may be in the form of a removable "memory stick". The handset 1 may also be provided with a dedicated image processor (not shown) so as to reduce processing load on the microcontroller 8. Thus, the handset 1 may operate as a digital camera capable of capturing and storing still and/or moving pictures.

An overview of digital cameras is given in "Complete Guide to Digital Cameras" by Michael Murie (Prompt Publications, 1999).

Figure 3:
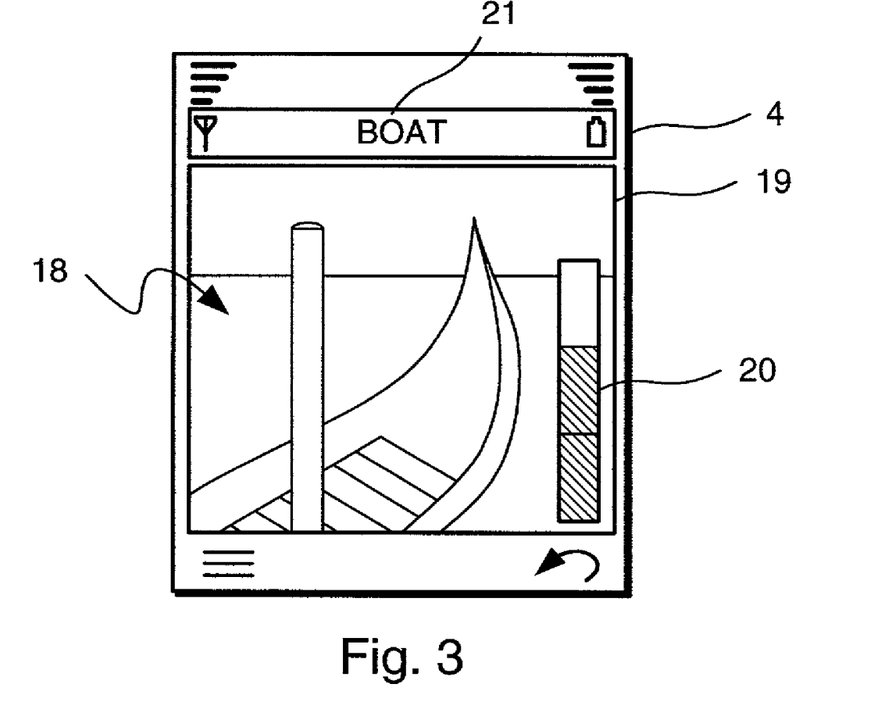
FIG. 3 shows an LCD displaying an image captured by a digital camera with an indicator of image quality.

FIG. 3 shows LCD 4 when the handset 1 is in a camera state, which is sometimes known as "camera mode". An image 18, in this example a picture of a boat, is captured by the camera unit 7 (FIG. 1) and is displayed by the microcontroller 8 in an image window 19. The image window 19 includes an indicator 20 in the form of a three-level bar. The indicator 20 specifies whether the handset 1 is able to capture an image of optimum quality in terms of exposure, white balance and dark reference. The image 18 is provided with a header 21 which allows the user to label the image 18.

The image window 19 is used as a viewfinder to help the user to compose a picture. The user directs the camera unit 7 (FIG. 1) at a subject or scene, while the handset 1 automatically performs exposure control, adjusts white balance and determines dark reference using algorithms which are known per se. In this example, the microprocessor 8, in conjunction with the camera unit 7, executes the algorithms.

An exposure control algorithm, which is often referred to as auto-exposure or simply "AE", is analogous to shutter speed control on a film camera, but in the case of a CMOS sensor it adjusts pixel integration time and the various gain blocks in the system to satisfy the luminance of the scene and, if appropriate, to reject flicker due to lighting running off an alternating current source.

A white balance algorithm, which is often referred to as auto-white balance or simply "AWB", attempts to adjust gains on the red, green and blue colour channels to correct imbalances caused by the spectral content of the scene illumination.

A dark calibration algorithm attempts to subtract from a captured image the effects of dark current, which is the pixel leakage current. This quantity varies markedly with temperature. Information on the dark current is often derived from several rows or columns of pixels outside the usable image area which are masked to exclude ambient light.

Generally, a stable solution to each algorithm is found by holding the handset 1 steady and allowing the handset 1 to try different conditions and settle on a set of solutions which represent an optimal image. However, the handset 1 will have difficulty determining the optimal image, if the subject or scene comprises for example moving objects or both high and low levels of lighting.

According to the present invention, the user is provided with feedback to indicate whether the handset 1 is ready to take a picture, i.e. whether the algorithms have converged, and, if not, to allow the user to take appropriate measures, such as holding the handset 1 steady.

Figure 4:
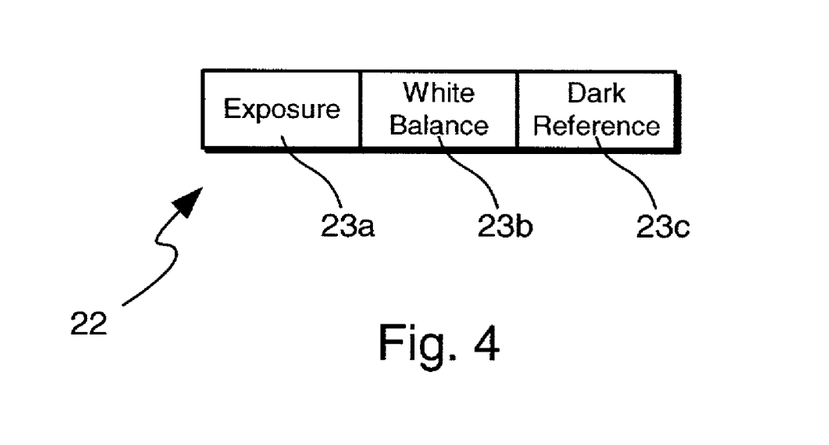
FIG. 4 is a schematic diagram of a 3-bit register.

FIG. 4 shows a control register 22 comprising first, second and third flags 23a, 23b, 23c which represent whether or not a stable solution of each algorithm has been found. In this case a flag set to "1" represents a stable solution. At one extreme, if all three flags 23a, 23b, 23c are set to "1", then the user is informed by shading all three levels $20_1$, $20_2$, $20_3$ of the indicator 20 (FIG. 3). At the other extreme, if none of the flags 23a, 23b, 23c are set, then none of the levels $20_1$, $20_2$, $20_3$ are shaded.

Figure 5A:
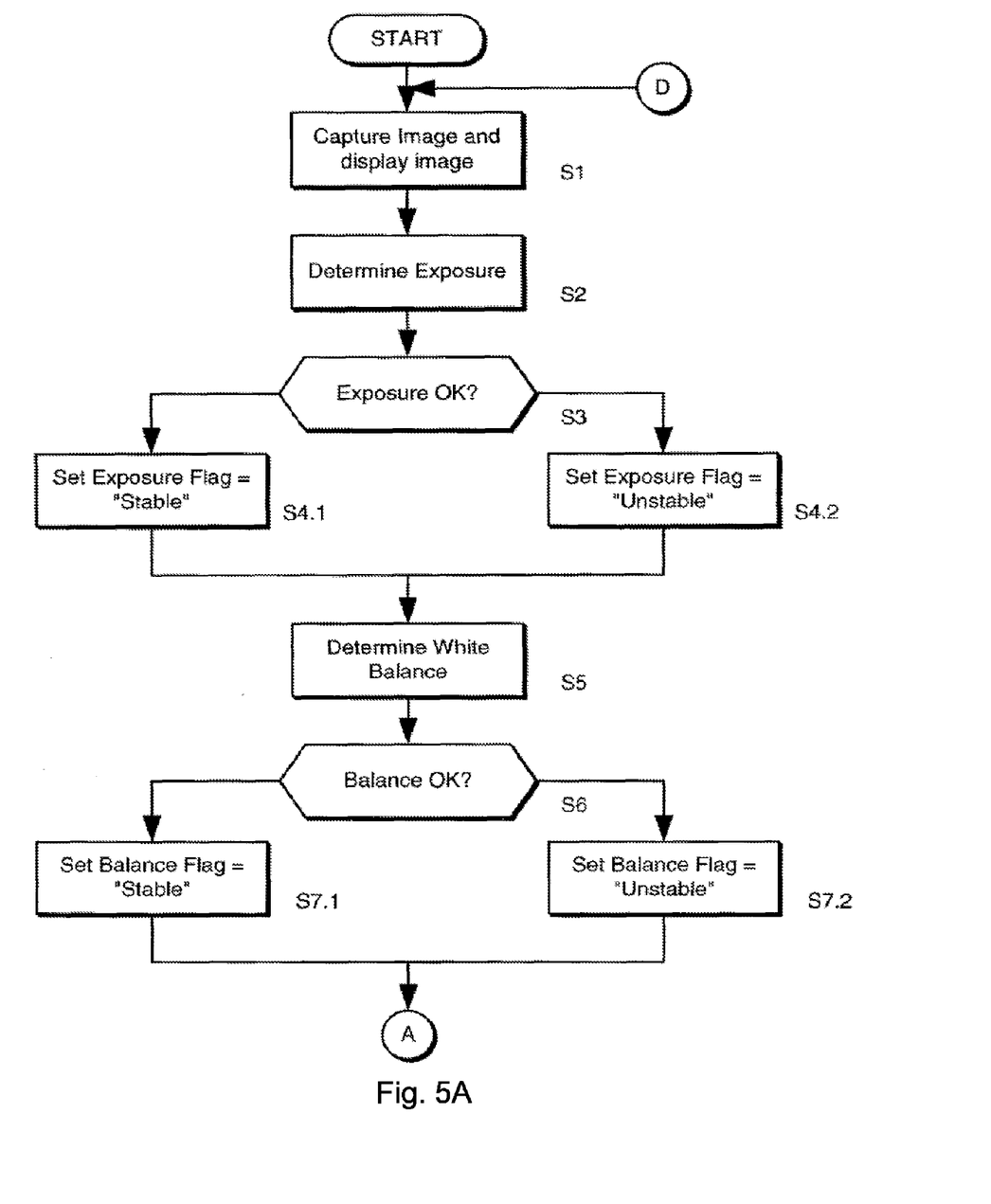
FIGS. 5A-C illustrate a process by which the quality of an image is determined and the indicator is displayed.
Figure 5B:
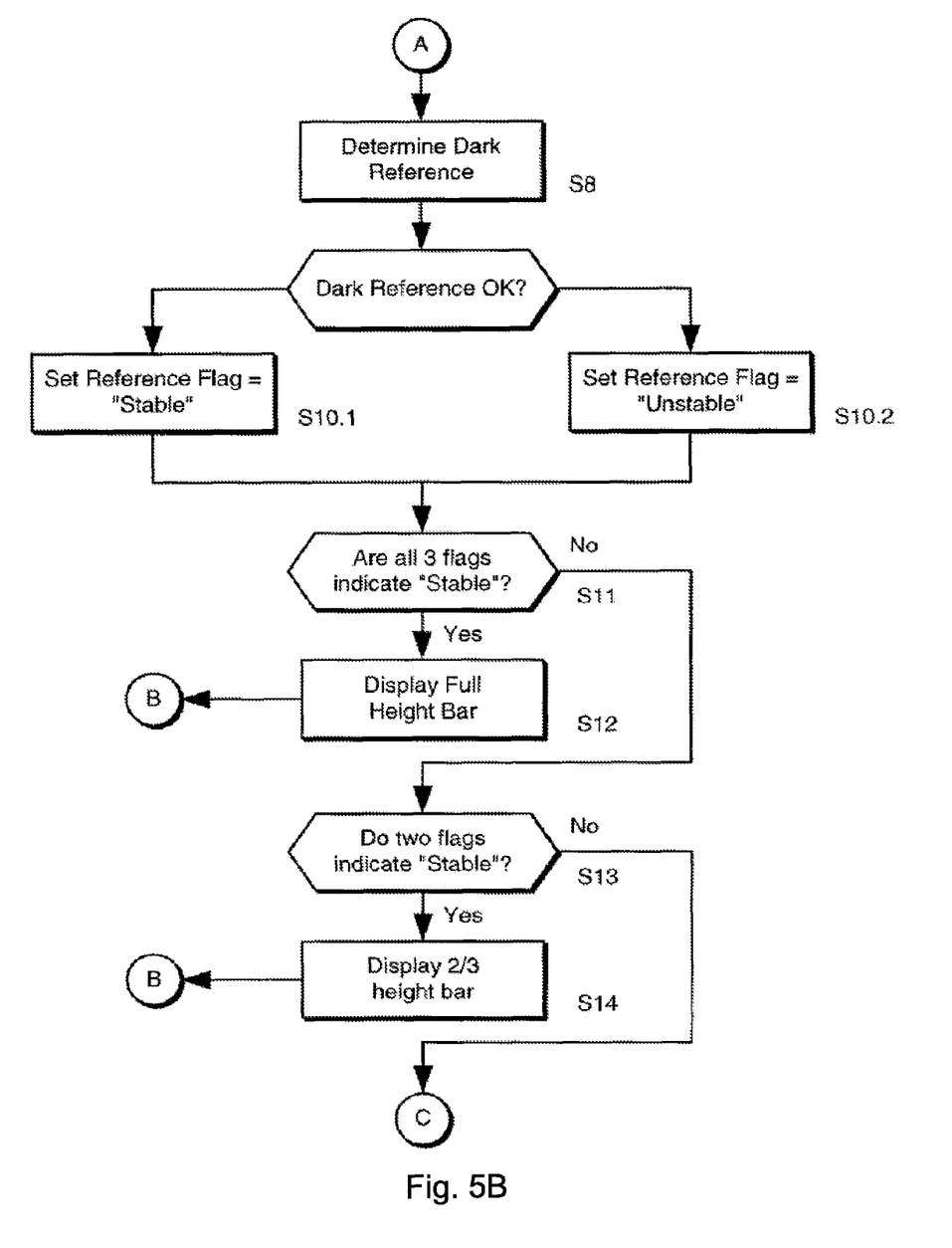
Figure 5C:
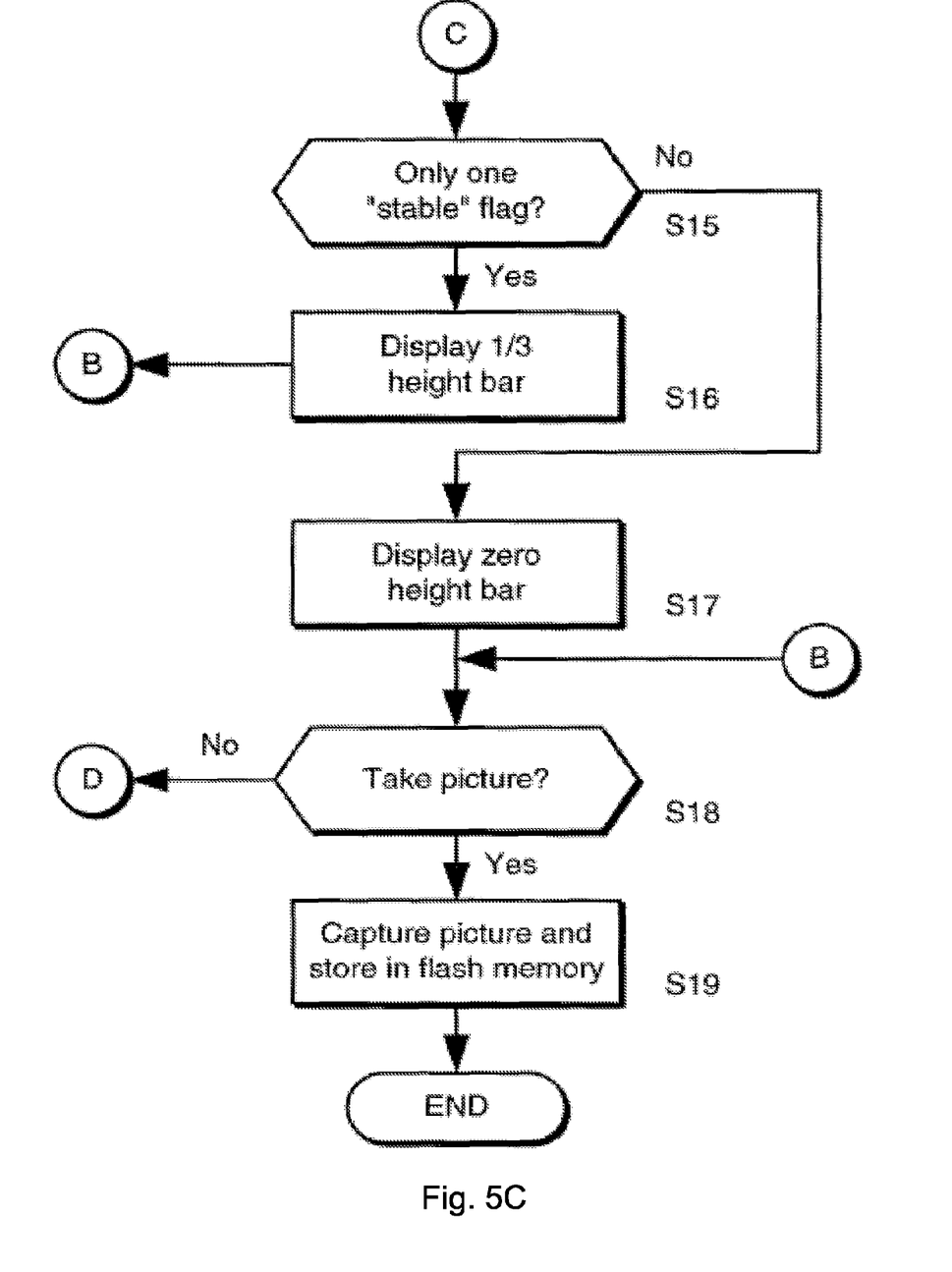

A process by which image quality is assessed and feedback provided will now be described:

Referring to FIGS. 5A-C, an image is captured by the camera unit 7 (FIG. 1) and displayed in the image window 19 (FIG. 3) (step S1). The microcontroller 8 executes the exposure control algorithm (step S2) and determines it has converged (step S3). If so, the first flag 23a is set to "1" indicating "stable" (step S4.1), otherwise, it is set to "0" indicating "not stable" (step S4.2). The microcontroller 8 runs a white balance algorithm (step S5)(step S6). If the algorithm converges, the second flag 23b is set to "1" indicating "stable" (step S7.1), otherwise, it is set to "0" indicating "not stable" (step S7.2). The microcontroller 8 runs a dark calibration algorithm (step S8) (step S9). If stable, the third flag 23c is set to "1" (step S10.1), otherwise, it is set to "0" (step S10.2).

The microcontroller 8 then checks the state of the register 22.

Figure 6:
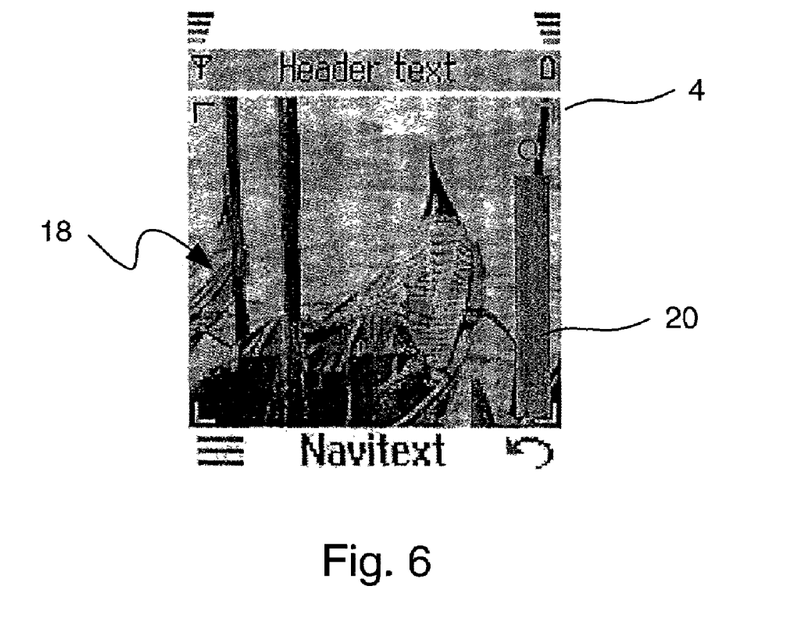
FIG. 6 shows an image of optimal quality.

Initially, the microcontroller 8 checks whether the three flags 23a, 23b, 23c of the register 22 are set to "stable" (step S11). If so, all three stages $20_1$, $20_2$, $20_3$ of the indicator 20 are shaded (step 12). Thus, the indicator appears as a fully-filled vertical bar. An example of an LCD 4 showing an optimal-quality image 18, with all three stages $20_1$, $20_2$, $20_3$ of the indicator 20 shaded, is shown in FIG. 6.

Figure 7:
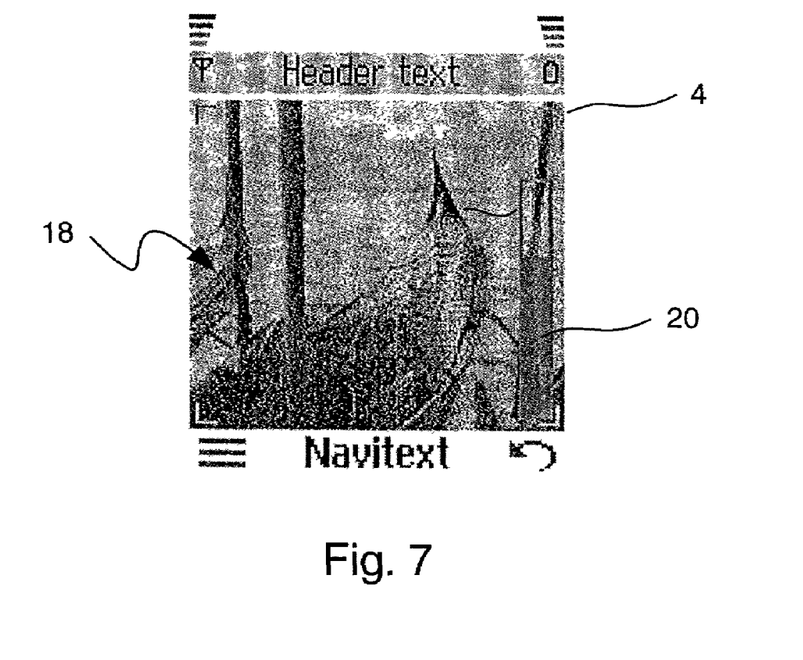
FIG. 7 shows an image of near-optimal quality.

If the first test fails, the microcontroller 8 checks whether any two of the flags 23a, 23b, 23c are set to "stable" (step S13). If two flags are set, then first and second levels $20_1$, $20_2$ of the indicator 20 are shaded (step S14). Thus, the indicator 20 appears as a bar which is two-thirds filled. An example of an LCD 4 showing a near-optimal quality image 18 is shown in FIG. 7.

Figure 8:
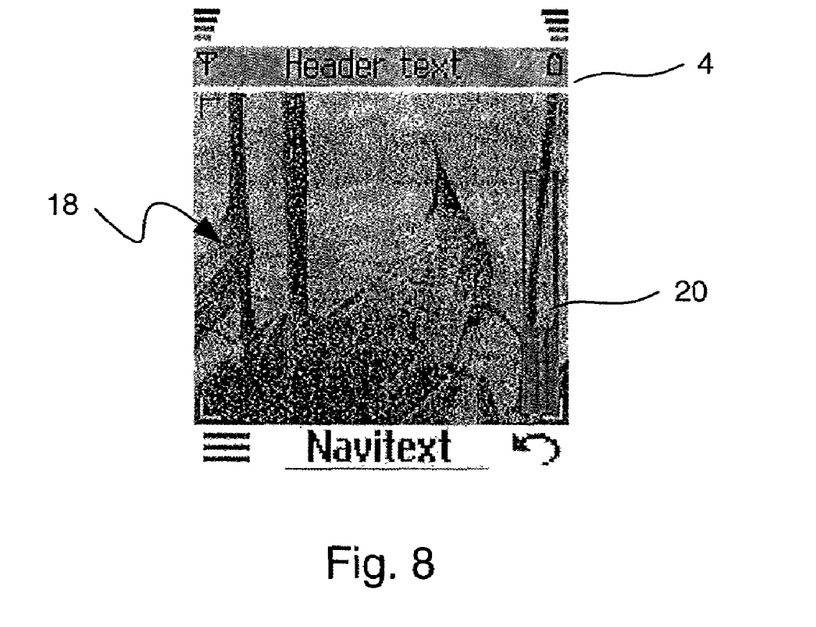
FIG. 8 shows an image of poor quality.

If the second test fails, the microcontroller 8 checks whether any one of the flags 23a, 23b, 23c is set to "stable" (step S15). If one of the flags 23a, 23b, 23c is set, then the first stage $20_1$ of the indictor 20 is shaded (step S16). Thus, the indicator 20 appears as a bar which is only one-third filled. An example of an LCD 4 showing a poor quality image 18 is shown in FIG. 8.

Figure 9:
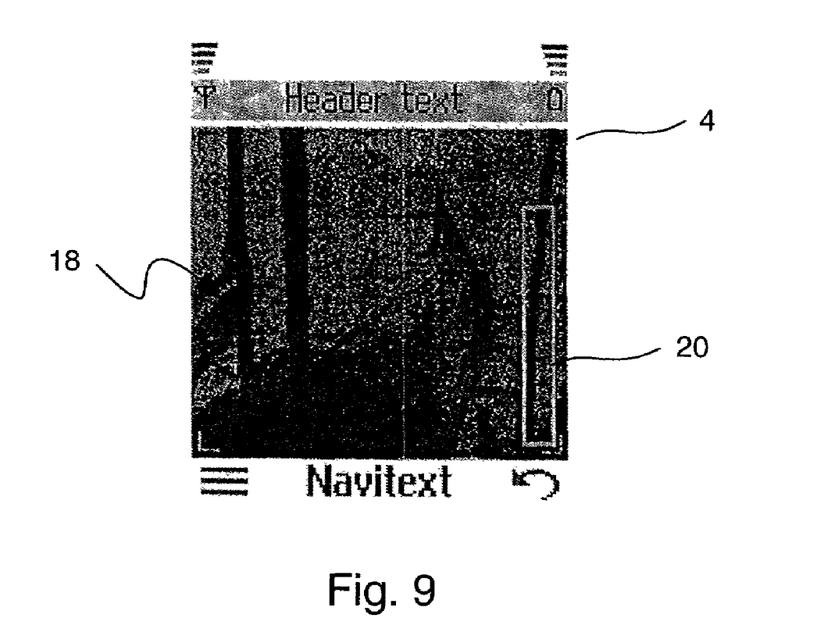
FIG. 9 shows an image of very poor quality.

If all of the tests fail and none of the flags 23a, 23b, 23c are set, then no part of the indicator 20 is shaded (step S17), as shown in FIG. 9.

The microcontroller 8 determines whether a key on the keypad 3 has been pressed (step S18). If a key has been pressed, then the image 18 is captured and stored in flash memory 10. Otherwise, the process returns to step S1.

This process has the advantage that the user is provided with real-time feedback as to the quality of the image 18 being captured. If the image 18 is of poor quality, then further exposure control and/or white balancing and/or dark calibration is needed. This may be remedied by holding the camera steady for a period of time, such as a few seconds, or re-composing the picture.

The microcontroller 8 performs the process described earlier under the control of a computer program stored in RAM/ROM 9, which is loaded and executed when handset 1 enters the camera state. It will be appreciated that the process may be executed by a dedicated image processor, which may itself be included in the camera unit 7.

Figure 10:
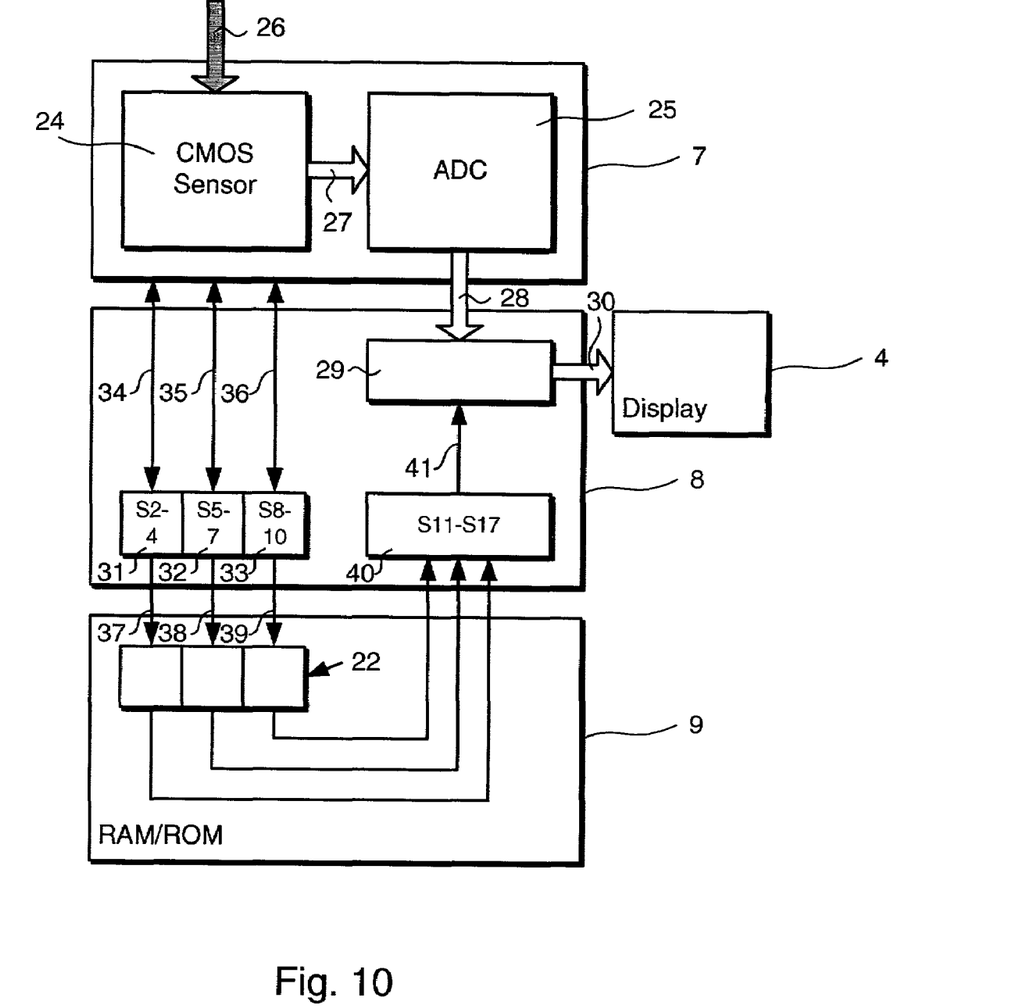
FIG. 10 is a schematic diagram of an arrangement of a digital camera unit, a processor, memory and display.

Referring to FIG. 10, an arrangement of the digital camera unit 7, microprocessor 8, RAM/ROM 9 and LCD 4 is shown.

The digital camera unit 7 includes a CMOS sensor 24 and an analogue-to-digital converter (ADC) 25. The CMOS sensor receives light 26 and generates a corresponding electrical signal 27 which is converted into an image signal 28. The image signal 28 is fed to the microcontroller 8 which operates display driving software 29 which provides a display signal 30 to the display 4.

The microcontroller 8 executes first, second and third routines 31, 32, 33. The first routine 31 performs the exposure control algorithm which encompasses steps S2 to S4 of the process shown in FIGS. 5A-C. The second routine 32 performs the white balancing algorithm which generally covers steps S5 to S7 of the process shown in FIGS. 5A-C. The third routine 33 performs the dark reference algorithm which is broadly encompasses steps S8 to S10. While performing the algorithms, the microcontroller 8 exchanges signals 34, 35, 36 with the camera unit 7. For example, the first routine 31 receives light levels and sends instructions regarding pixel integration time. The second routine 32 receives color channel information and sends instructions to adjust gain for each color channel. The third routine 33 receives information regarding pixel leakage and sends instructions to subtract this from the electrical signal 27.

First, second and third algorithm results 37, 38, 39 are sent to the register 22. In this example, the register 22 is held in RAM, although it could be held in the controller's memory (not shown).

The microcontroller 8 executes a fourth routine 40 which checks the content of the register 22 as outlined in steps S11 to S17 of the process shown in FIGS. 5*A-C*. The fourth routine 40 produces a signal 41 which is fed to the display driver 29 for displaying the indicator 20 appropriate to the content of the register 22.

It will be appreciated that step S2 to S10 and steps S11 to S17 need not be executed by the same processor and, in particular by the microcontroller 8. For example, steps S2 to S10 may be performed by a processor embedded in the camera unit 7.

It will be appreciated that many modifications may be made to the embodiment described above. For example, the digital camera unit may be mounted anywhere on the handset, for example on the front side of the handset or connected to the handset via a cable. The image sensor may comprise a different type of sensor, such as a charge coupled device (CCD).

Rather than determine whether a stable solution has been found, other criteria may be used to determine whether an image is ready to be captured. These criteria may include numerical thresholds or ranges.

Different shapes of indicators may be used such as a circular pie-chart. One or more flags may be used and one or more levels can be displayed. The number of flags need not equal the number of levels. The indicator may comprise multicolored indicator. Thus, for example a green shape may signify a picture of optimal quality picture, an amber shape may represent a near-optimal quality picture and a red shape may indicate a poor-quality picture. The indicator may be multi-shaped. Thus, a tick or check may signify an optimal-quality picture.

Additionally or alternatively, an audio signal may be provided as an indicator of image quality. This may comprise spoken words such as "ready" or "not ready", different tunes or tones of varying pitch.

The invention claimed is:

1. A digital camera comprising:
   a single composite image quality indicator configured to represent a plurality of image quality parameters based on an image,
      wherein the composite image quality indicator is generated based on data associated with the plurality of image quality parameters,
      wherein the single composite image quality indicator comprises a plurality of portions, each portion of the plurality of portions configurable between a first state and a second state, and
      wherein a number of indicator portions displayed in the second state corresponds to a number of image quality parameters that are determined to be stable; and
   a display for displaying the image together with the single composite image quality indicator, wherein the plurality of portions are displayed simultaneously.

2. A digital camera according to claim 1, wherein the image quality indicator indicates whether the image is optimal based on the plurality of image parameters.

3. A digital camera according to claim 2, wherein the plurality of image parameters includes a light exposure.

4. A digital camera according to claim 2, wherein the plurality of image parameters includes a white balance.

5. A digital camera according to claim 2, wherein the plurality of image parameters includes a dark reference.

6. The digital camera according to claim 1, further comprising a mobile communications device.

7. The digital camera according to claim 1, further comprising a mobile telephone handset.

8. A method comprising:
   determining a number of image quality parameters that are stable; and
   displaying a user interface having a single composite image quality indicator representing a plurality of image quality parameters of an image,
      wherein the single composite image quality indicator comprises a plurality of portions, each portion of the plurality of portions displayable in a first state and second state,
      wherein the plurality of portions are displayed simultaneously in the user interface and
      wherein a number of the plurality of portions displayed in the second state corresponds to a number of image quality parameters that are determined to be stable.

9. A method according to claim 8, further comprising capturing the image.

10. A method according to claim 9, further comprising displaying the captured image, together with the single composite image quality indicator.

11. A method according to claim 9, further comprising executing at least one algorithm for determining the quality of the image.

12. A method according to claim 11, wherein executing at least one algorithm for determining the quality of an image captured includes determining light exposure for the image.

13. A method according to claim 12, wherein executing the at least one algorithm for determining the quality of an image captured includes performing a white balance of the image.

14. A method according to claim 11, wherein executing the at least one algorithm for determining the quality of an image captured includes determining a dark reference for the image.

15. A method according to claim 11, comprising determining whether the at least one algorithm has been found to be stable.

16. A method according to claim 8 wherein the image quality indicator is displayed within the image.

17. A computer program stored on a computer readable medium for capturing an image on a digital camera, said computer program, when executed, causing the digital camera to perform the method of claim 8.

18. A method comprising:
   providing a user interface of a digital camera having a composite image quality indicator representing a plurality of image quality parameters, wherein the composite image quality indicator is generated based on data associated with the plurality of image quality parameters and wherein the composite image quality indicator includes a plurality of segmented portions, each of the plurality of segmented portions displayable in a first state and a second state;
   determining whether a first image quality parameter of the plurality of image quality parameters is stable; and
   displaying a first segmented portion of the plurality of segmented portions in the second state in response to determining that the first image quality parameter is stable, wherein a number of segmented portions displayed in the second state corresponds to a number of the plurality of image quality parameters that are determined to be stable.

19. A method according to claim 18, comprising executing at least one algorithm for determining the quality of the image.

20. The method of claim 18, wherein determining whether the first image quality parameter is stable further comprises the step of determining whether one or more image quality algorithms converge.

21. The method of claim 20, wherein the one or more image quality algorithms comprises at least one of a white balance algorithm, a dark calibration algorithm and an exposure control algorithm.

22. A computer readable medium storing computer readable instructions that, when executed, cause a processor to perform a method comprising:
   determining a number of image quality parameters that are stable; and
   displaying a user interface having a single composite image quality indicator representing a plurality of image quality parameters of an image,
      wherein the single composite image quality indicator comprises a plurality of portions, each portion of the plurality of portions displayable in a first state and a second state,
      wherein the plurality of portions are displayed simultaneously in the user interface, and
      wherein a number of the plurality of portions displayed in the second state corresponds to a number of image quality parameters that are determined to be stable.

23. The computer readable medium of claim 22, wherein the first state corresponds to an unshaded appearance and the second state corresponds to a shaded appearance.

24. The computer readable medium of claim 22, wherein determining a number of image quality parameters that are stable includes analyzing a digital image of a digital camera.

25. A computer readable medium storing computer readable instructions that, when executed, cause a processor to generate a user interface comprising:
   a composite image quality indicator configured to represent a plurality of image quality parameters, the image quality indicator having a plurality of portions, each of the plurality of portions displayable in a first state and a second state,
   wherein the plurality of portions are displayed in the user interface simultaneously, and
   wherein a number of the plurality of portions displayed in the second state corresponds to a number of the plurality of image quality parameters determined to be stable.

26. The computer readable medium of claim 25, wherein the user interface further comprises a digital image and wherein the composite image quality indicator is overlaid on the digital image.

27. The computer readable medium of claim 25, wherein the first state corresponds to an unshaded appearance and the second state corresponds to a shaded appearance.

* * * * *